United States Patent
Wray

(10) Patent No.: US 9,104,419 B2
(45) Date of Patent: Aug. 11, 2015

(54) POWER SAVING DEVICES AND SYSTEMS, AND METHODS OF USE AND FABRICATION THEREOF

(75) Inventor: Melvyn John Wray, Aylesbury (GB)

(73) Assignee: Allied Telesis, Inc., San Jose, CA (US)

( * ) Notice: Subject to any disclaimer, the term of this patent is extended or adjusted under 35 U.S.C. 154(b) by 574 days.

(21) Appl. No.: 12/620,091

(22) Filed: Nov. 17, 2009

(65) Prior Publication Data

US 2010/0123578 A1    May 20, 2010

Related U.S. Application Data

(60) Provisional application No. 61/115,267, filed on Nov. 17, 2008.

(51) Int. Cl.
| | |
|---|---|
| G08B 21/00 | (2006.01) |
| G09F 13/00 | (2006.01) |
| H05B 41/16 | (2006.01) |
| H05B 41/24 | (2006.01) |
| G05F 1/00 | (2006.01) |
| H05B 37/00 | (2006.01) |
| G06F 1/32 | (2006.01) |
| G06F 11/32 | (2006.01) |

(52) U.S. Cl.
CPC ............ *G06F 1/3265* (2013.01); *G06F 1/3203* (2013.01); *G06F 1/3218* (2013.01); *G06F 1/3287* (2013.01); *G06F 11/325* (2013.01); *Y02B 60/1242* (2013.01); *Y02B 60/1282* (2013.01)

(58) Field of Classification Search
USPC .......................................................... 340/540
See application file for complete search history.

(56) References Cited

U.S. PATENT DOCUMENTS

| | | | | |
|---|---|---|---|---|
| 5,369,623 A | * | 11/1994 | Zerangue | 367/93 |
| 5,457,664 A | * | 10/1995 | Izukawa et al. | 368/80 |
| 5,499,012 A | * | 3/1996 | Tracy et al. | 340/514 |
| 5,925,131 A | * | 7/1999 | Novoa et al. | 713/300 |
| 6,173,352 B1 | * | 1/2001 | Moon | 710/301 |
| 6,310,445 B1 | * | 10/2001 | Kashaninejad | 315/291 |
| 6,647,278 B2 | * | 11/2003 | Mitten et al. | 455/567 |
| 7,049,941 B2 | * | 5/2006 | Rivera-Cintron et al. | 340/425.5 |
| 7,050,037 B1 | * | 5/2006 | Kuramatsu | 345/102 |
| 7,190,121 B2 | * | 3/2007 | Rose et al. | 315/129 |
| 7,839,295 B2 | * | 11/2010 | Ries, II | 340/815.45 |
| 2002/0113714 A1 | | 8/2002 | Lopez | |

(Continued)

FOREIGN PATENT DOCUMENTS

| | | |
|---|---|---|
| JP | 7-44144 A | 2/1995 |
| JP | 11195176 | 7/1999 |

(Continued)

OTHER PUBLICATIONS

Notification of Reasons for Rejection issued Jul. 17, 2013, in counterpart Japanese Patent Application No. 2011-536596 (6pp including English translation).

*Primary Examiner* — Daniel L Negron
*Assistant Examiner* — Mohamed Barakat

(57) ABSTRACT

The present invention relates to systems and methods for controlling indicators on a device to achieve power and energy conservation. The systems and methods include enabling one or more indicators on the device and further include triggering the disablement of one or more of the indicators on the device based upon a disabling event. Upon detecting an enabling event, the systems and methods include re-enabling one or more of the disabled indicators.

27 Claims, 7 Drawing Sheets

(56) References Cited

U.S. PATENT DOCUMENTS

| | | |
|---|---|---|
| 2003/0051179 A1* | 3/2003 | Tsirkel et al. .................. 713/300 |
| 2003/0105794 A1 | 6/2003 | Jasinschi et al. |
| 2005/0055474 A1 | 3/2005 | Yang |
| 2005/0248930 A1* | 11/2005 | Naval et al. ...................... 362/85 |
| 2005/0270169 A1* | 12/2005 | Drader et al. .............. 340/691.1 |
| 2006/0038506 A1* | 2/2006 | Rose et al. .................... 315/247 |
| 2006/0281499 A1* | 12/2006 | Farrow .......................... 455/574 |

FOREIGN PATENT DOCUMENTS

| | | |
|---|---|---|
| JP | 2002-210232 A | 8/2000 |
| JP | 2001-184583 A | 7/2001 |
| JP | 2007-53846 A | 3/2007 |
| JP | 2007-96462 A | 4/2007 |
| JP | 3140548 U | 3/2008 |

* cited by examiner

POWER SAVING DEVICES AND SYSTEMS, AND METHODS OF USE AND FABRICATION THEREOF

CROSS-REFERENCE TO RELATED APPLICATIONS

This application claims priority to U.S. Provisional Application No. 61/115,267, titled "Power Saving Devices and Systems, and Methods of Use and Fabrication Thereof," filed Nov. 17, 2008, which is incorporated by reference herein in its entirety.

BACKGROUND OF THE INVENTION

Field of the Invention

Aspects of the present invention relate to the field of power savings in electronics, computer manufacturing, and other fields, and in particular to devices, systems, and methods for saving indicator (e.g., visual indicator) energy costs, such as energy costs of light emitting diodes (LED) and other indicators of power, status, or other information for computer-related and other electronic-related equipment, including such indicators for equipment relating to signal and software activity, and other associated energy costs.

SUMMARY OF ASPECTS OF THE PRESENT INVENTION

There remains an unmet need in the art to provide power and energy savings for various aspects of electronics and other computer-related equipment. For example, many types of computer equipment and related devices have continuous or persistent LED or other visible displays (e.g., indicator of status of equipment being "on") or other indicators (e.g., audio indicators). While the energy use and related costs of such displays may be small, the collective costs of such displays for large systems can be significant. These collective costs can also include the cumulative costs of dissipating heat produced by such displays. In addition, continuous or persistent displays or other indicators may often be unnecessary (e.g., for activity information on server-related or other equipment in server rooms that are infrequently accessed).

There is a further unmet need in the related art for efficient control of such displays and indicators in a manner that does not affect the continuous and/or persistent display characteristics. For example, status indicators may be desired to be displayed when a person enters a server room on occasion. Also, it may be desired to control such displays remotely, such that each such display does not need to be physically accessed to enable or disable (including temporarily) such display.

Aspects of the present invention relate to providing power savings in electronics, computer manufacturing, and other fields, and in particular to devices, systems, and methods for saving indicator energy costs, such as energy costs of light emitting diodes (LED) and other indicators of power, status, or other information for computer-related and other electronic-related equipment, including for equipment relating to signal and software activity, and other related energy costs.

One illustrative example in accordance with aspects of the present invention relates to fiber optic communication devices. It is standard in the computer industry for devices relating to fiber optic communications to include an indicator on the device to indicate that a valid link exists between two ends of the fiber optic cable. It should be appreciated that in addition to fiber optics, other communication mediums, e.g., copper, may be used. In some implementations, more than one device may redundantly provide such indication of the valid link (e.g., continually emitting green LED), and the continuous indication of the link may be unnecessary (e.g., users may not continually need such indication, or indication may occur in a server room infrequently accessed).

One variation of the present invention includes hardware devices to disable or make dormant (e.g., temporarily) the power or activity indicators, as well as methods and systems for controlling one or more such hardware devices. Exemplary control methods and systems in accordance with aspects of the present invention may include use of motion detectors, light detectors (e.g., of room illumination, or other sensor or switch linked activation (e.g., control of indicators linked to the light on/off switch for a room), or other user-initiated activity, as well as software related aspects for such control.

Exemplary software control in accordance with aspects of the present invention may include software to monitor sensored activity or timers and/or to otherwise control indicator operation; as well as software to remotely control such indicators (e.g., from a network terminal, a user may be able to control indicators on servers at a server farm remote from the user). For example, in a server room implementation, such indicators may only need to be controlled at the time of start up or in the event a problem is detected. Software and hardware in accordance with aspects of the present invention may be used to enable the indicators upon occurrence of these events, and disable the indicators at specified times.

In addition to reducing and/or otherwise addressing such display/indicator related energy consumption and other costs, aspects of the present invention relate to addressing indicator-related energy reduction in concert with other power-related energy consumption and other costs. For example, other energy-related costs can include higher efficiency or lower power consumption power supplies and other components in the equipment, in which the display indicator cost reduction aspects of the present invention are implemented.

In one variation in accordance with aspects of the present invention, a physically controlled switch is provided at the system, machine, and/or device level. Among other things, providing the physical control switch allows enablement/disablement of indicators, regardless of the status of software and other features internal to the system, machine, and/or device. For example, for aspects directed to software controlled indicators (e.g., software to enable/disable indicators), enablement/disablement of the indicators necessitates software access. If a user is unable to access the necessary software, such enablement/disablement is prevented.

In one illustrative implementation of the present invention, virtually all indicators are controlled by a physical switch, and only a single or a few indicators remain continuously or persistently on, such as only to indicate system status as active, rather than individual component activity, for example.

Aspects of the present invention also relate to various software related features. For example, software aspects of the present invention are usable with related art features known as "Ethernet in the first mile" (EFM). The EFM standard was included into the IEEE 802.3 standard, which is incorporated herein by reference. With EFM, rather than completely controlling management, for example, of remote equipment from a local device, management control occurs at the remote location, and the local device uses a small amount of communications bandwidth for operation of the remote management control. In accordance with aspects of the present invention, control of indicators at the remote location may occur via software within the context of EFM, for example.

In another illustrative example, control of other remote devices may similarly occur in accordance with aspects of the present invention. For example, control of indicators on remote set top boxes or other remote devices that are part of a cable or telephone company provider's system may be controlled by the cable or telephone system operator at a central location.

In some variations of the present invention, both software and hardware controls are provided. For example, with the EFM example, indicators may be controlled via software at a remote location, and hardware switches may also be provided at the remote location to allow enablement/disablement at that location via the switches.

In a further illustrative example in accordance with the above software and hardware combination aspects of the present invention, a blade server may have a number of blade portions within its chassis, and each blade may have one channel controlling a remote unit. A control function in the blade server software may be used to control the indicators on each remote unit. Alternatively, or in addition to the software control in the blade server, a hardware switch may be provided on the blade server to control indicators on the blade server and/or at the remote units. At each remote unit, a hardware switch is provided to allow separate control of the indicators at that unit location.

In yet another illustrative example, in accordance with aspects of the present invention, the indicators for one or more devices may be controlled locally via a controlling software and/or hardware device. For example, each of a group of servers and related equipment in a server room may have associated indicators. The room illumination (e.g., overhead lights) may be controlled by a motion sensor. Activation of the room illumination (e.g., by a user entering the room, thereby triggering the motion sensor) may be used to activate one or more of the server and related equipment indicators. For example, the switch may be hardwired to transistor or software controlled switches on each of the server/related equipment indicators, and engagement of the room light switch may automatically enable all indicators via the control switches. Alternatively, for example, light sensors may be emplaced on each of the servers/related equipment, and illumination may thereby trigger activation of each server/related equipment switch, in turn activating each indicator. In some variations, the switches on the servers/related equipment may automatically deactivate upon the illumination of the room ceasing (e.g., upon loss of illumination signal in the sensors) or upon a preset period passing following sensor triggering or loss of light signal, for example.

Similarly, other user-initiated devices may be used to control such server/related equipment switches, either collectively or individually. For example, one or more remote control devices (e.g., optical, sonic, infrared (IR), or electromagnetic handheld remote control devices, emitting one or multiple frequency outputs for variable control) may be used to enable/disable the indicators via sensors/receptors at the hardware switches.

Additional advantages and novel features of aspects of the invention will be set forth in part in the description that follows, and in part will become more apparent to those skilled in the art upon examination of the following or upon learning by practice of the invention.

BRIEF DESCRIPTION OF THE FIGURES

The disclosed aspects will hereinafter be described in conjunction with the appended drawings, provided to illustrate and not to limit the disclosed aspects, wherein like designations denote like elements, and in which.

DETAILED DESCRIPTION

One exemplary illustration of aspects of the present invention relates to use of LEDs to provide an indication of the connectivity status on networking products. This functionality may typically only be used in troubleshooting or at system setup, for example. Much of the rest of the time that devices having such indicators are in operation, the LEDs may simply consume power with no real purpose. Aspects of the present invention provide the capability to enable or disable one or more of these LEDs via hardware and/or software. In some cases, hardware control (e.g., physical switch) may be useful where software control may not allow for evaluation of the status of the activity (e.g., connection status), absent gaining software management access to the device. For this reason, in some variations, a physical switch may be used to enable a user to disable the LEDs when their operation is not required.

In another variation of the present invention, automatic or other controlled disabling of the LEDs occurs after a specified period of time, so that the user does not need to remember to turn off LEDs after viewing equipment status/indicators.

As an illustrative example in accordance with aspects of the present invention, it is noted that the power savings in a simple 24-port switch over a given time period may be on the order of 0.6 watts. In addition, the thermal benefit of making such indicator operation dormant may be a reduction of ambient temperature (e.g., on the order of 2 degrees Celsius in the immediate vicinity of the switch itself). In a larger platform, such as a chassis, a larger power savings may be obtained. For example, an education network utilizing 1000 24-port switches may obtain a power savings on the order of 600 watts. The total thermal contribution from the switches for this network would be similarly reduced, and therefore the air conditioning requirement would correspondingly be reduced, thereby saving additional power and other costs.

Figure 1A:
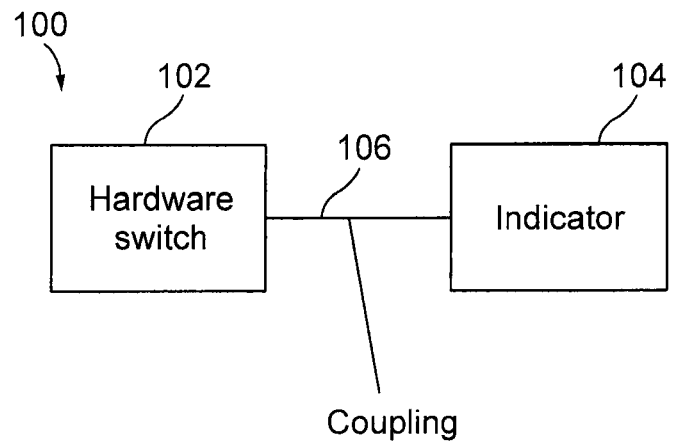
FIG. 1A is a representative block diagram of various components and exemplary features of a hardware switch control in accordance with aspects of the present invention.

FIG. 1A is a representative block diagram of various components and exemplary features of a hardware switch control 100 in accordance with aspects of the present invention. In FIG. 1A, a hardware switch 102 is provided (e.g., a push button switch on a server chassis) that is capable of enabling and disabling one or more indicators 104 (e.g., LED power and/or activity lights, or audio indicators) via a coupling 106 (e.g., the hardware switch is located in a circuit between a voltage high in a power source and the indicator, and the indicator is located in the circuit between the hardware switch and ground; the hardware switch via its location in the circuit is able to interrupt power to the indicator).

Figure 1B:
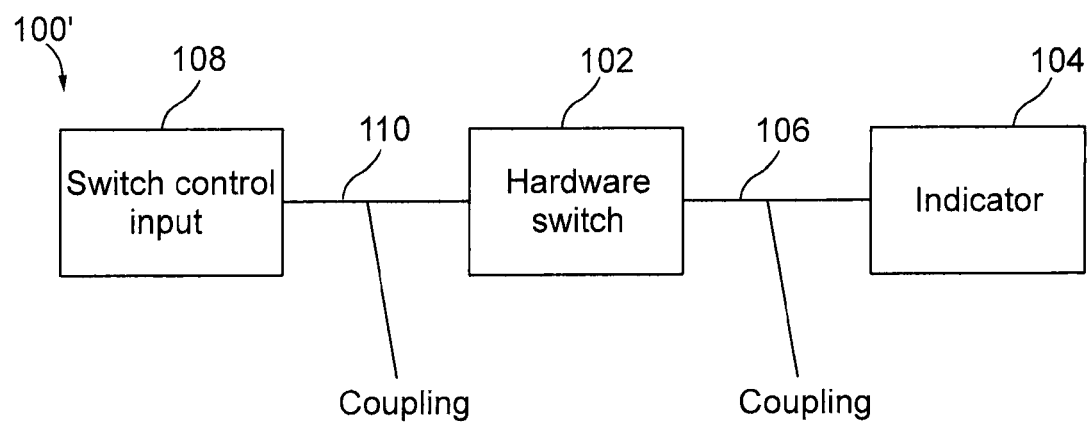
FIG. 1B is a representative block diagram of various components and exemplary features of another variation of a hardware switch control in accordance with aspects of the present invention.

FIG. 1B is a representative block diagram of various components and exemplary features of another variation of a hardware switch control 100' in accordance with aspects of the present invention. In FIG. 1B, a hardware switch 102 is provided that is capable of enabling and disabling one or more indicators 104 via a coupling 106, similarly to operation of the device shown in FIG. 1A. In contrast to FIG. 1A, however, a switch input control 108 is located so as to enable hardware switch 102 operation. For example, the switch input control 108 may comprise an infrared sensor that produces an output upon infrared detection, and the switch may comprise a transistor, with the output of the sensor being coupled 110 to the transistor 102. The switch input control 108 may also comprise, for example, a pressure sensor that produces an output upon a change in pressure, e.g., when a person enters a room or upon voice activation, among other changes in pressure. In addition, the switch input control 108 may comprise, for example, a wireless sensor that produces an output upon wireless detection, among other types of communication sensors. The switch control input 108 may thereby control operation of the indicator 104 by using the output of the sensor to activate and deactivate the indicator 104 via control of the hardware switch transistor 102.

Figure 2:
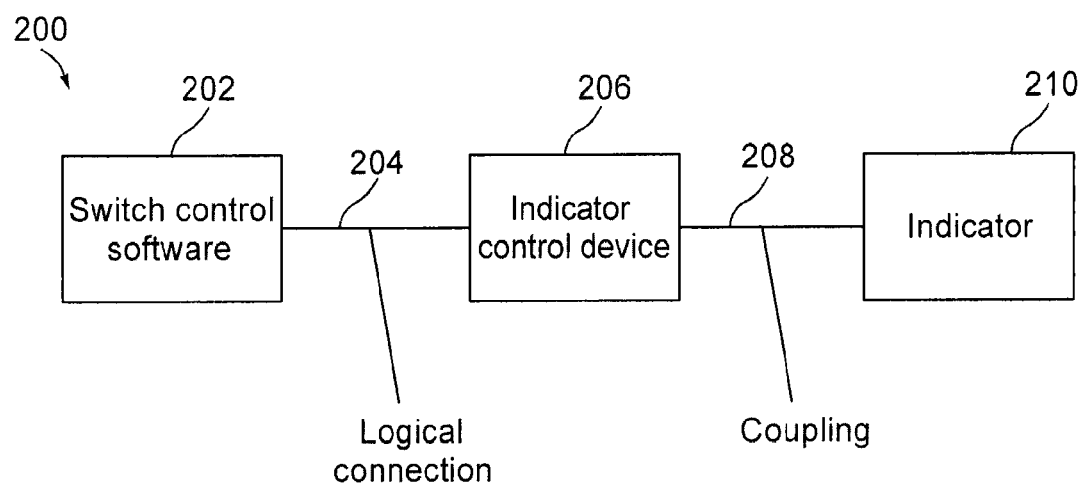
FIG. 2 is a representative block diagram of various components and exemplary features of another variation of a software switch control, in accordance with aspects of the present invention.

FIG. 2 is a representative block diagram of various components and exemplary features of another variation of a switch control 200 having software, in accordance with aspects of the present invention. As shown in FIG. 2, the indicator 210 is coupled 208 to an indicator control device 206 (e.g., a device comprising one or more transistors, at least one transistor controlling operation of the indicator, and the device including features for receiving software logical inputs for control of the device), which in turn is in logical communication 204 with switch control software 202. In operation, receipt of a signal from the switch control software 202 (e.g., a user input to disable or enable an indicator) causes the indicator control device 206 to cause indicator 210 activity (e.g., corresponding disabling or enabling of the indicator).

Figure 3:
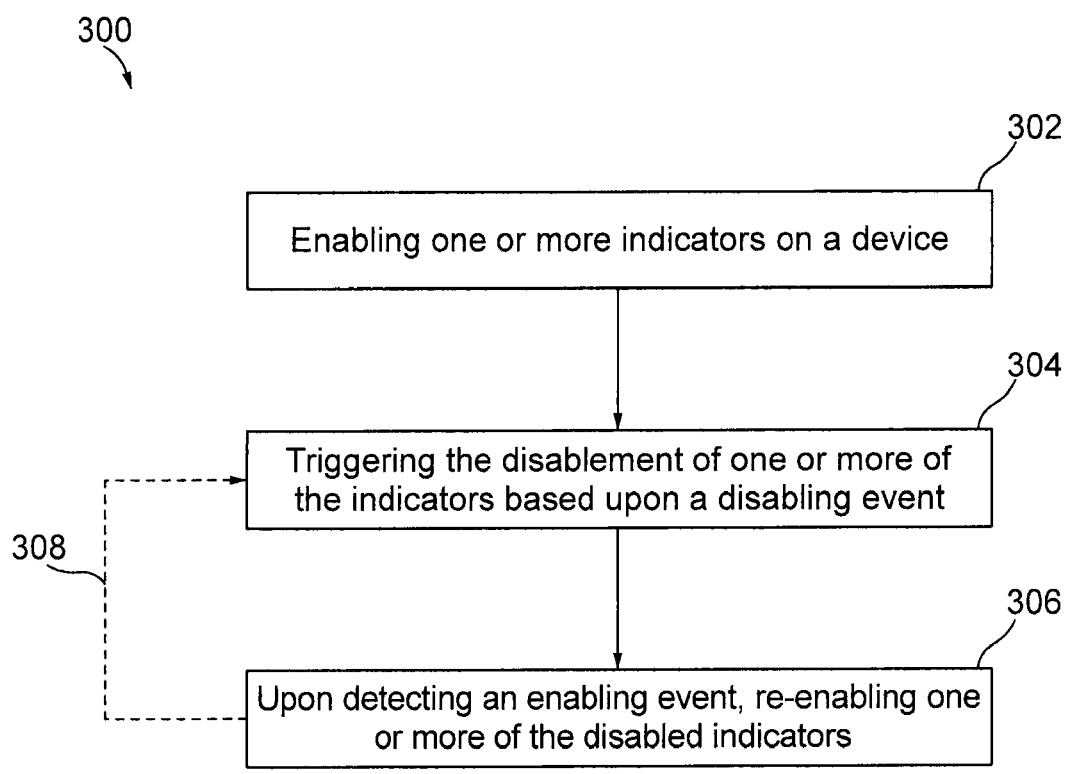
FIG. 3 illustrates an example method flow for controlling indicators on a device in accordance with aspects of the present invention.

Turning now to FIG. 3, illustrated is an example method flow 300 for controlling indicators on a device in accordance with aspects of the present invention. At step 302, one or more indicators on a device indicating power, status, or other information for the device are enabled. It should be appreciated that the indicators may include an LED, a liquid crystal display (LCD), plasma, or a light bulb, among other visual displays, or audio indicators, among other types of indicators that indicate the power, status, or other information for the device. Enabling the indicators on the device may include, for example, a continuous or persistent indication that the status of the device is "on" or that a valid link is established on the port (e.g., continually green emitting LED), among other methods for enabling the indicators.

Next, at step 304, a disabling event triggers the disablement of one or more of the indicators on the device, e.g., turning off a continually green emitting LED or other methods for indicating that the status of the indicator has changed. It should be appreciated that the disabling event may identify and eliminate power wastage in the device by disabling one or more indicators that are non-essential for operating the device, allowing the device to run on the lowest possible power mode. For example, the continuous indication of a valid link may be unnecessary on a device located in a server room that is entered into infrequently and thus, the indicator may be temporarily disabled upon the occurrence of the disabling event.

In one variation, the disabling event may be deactivating light detectors (e.g., upon loss of room illumination, or other sensor or switch linked activation, e.g., control of indicators linked to the light on/off switch for a room). In another variation, the disabling event may be a user controlling the device remotely. For example, one or more remote control devices, e.g., optical, sonic, infrared (IR), or electromagnetic handheld remote control devices, emitting one or multiple frequency outputs for variable control, may be used to disable the indicators via sensors/receptors at a hardware switch on the device. In yet another variation, the disabling event may be a user turning off a switch on the device, or a timer expiring after a predetermined time period, among other events causing the disablement of the indicators.

It should be appreciated that the disabling event may be a single event, or any combination of events which cause the indication that the status of the device is "off." Moreover, it should be appreciated that the disabling event may be used to control the indicators, either collectively or individually, or that various disabling events may be used to control the indicators, either collectively or individually.

At step 306, upon detecting an enabling event, one or more of the disabled indicators on the device are re-enabled, e.g., a continuous or persistent indication that the status of the device is "on" (e.g., continually green emitting LED) is re-enabled. In one variation, the enabling event may be activating motion detectors or light detectors (e.g., of room illumination, or other sensor or switch-linked activation, e.g., control of indicators linked to the light on/off switch for a room). For example, a user may enter a room and/or turn on a light for a room. In another variation, the enabling event may be a user remotely controlling the indicators on the device, e.g., from a network terminal, a central location, or enabling a switch located at a remote location which triggers the enablement of the indicators on the device, among other events occurring remotely from the device. In yet another variation, the enabling event may be a timer expiring after a predetermined time period, detecting an occurrence of a problem on the device, or a user turning on a switch on the device, among other events causing the enablement of the indicators.

It should be appreciated that the enabling event may be a single event, or any combination of events which cause the indication that the status of the device is "on". Moreover, it should be appreciated that the enabling event may be used to control the indicators, either collectively or individually, or that various enabling events may be used to control the indicators, either collectively or individually.

In an aspect, the process may repeat, at step 308, and upon detection of a new disabling event, the re-enabled indicators on the device are triggered to disable, as discussed above in regards to step 304.

Figure 4:
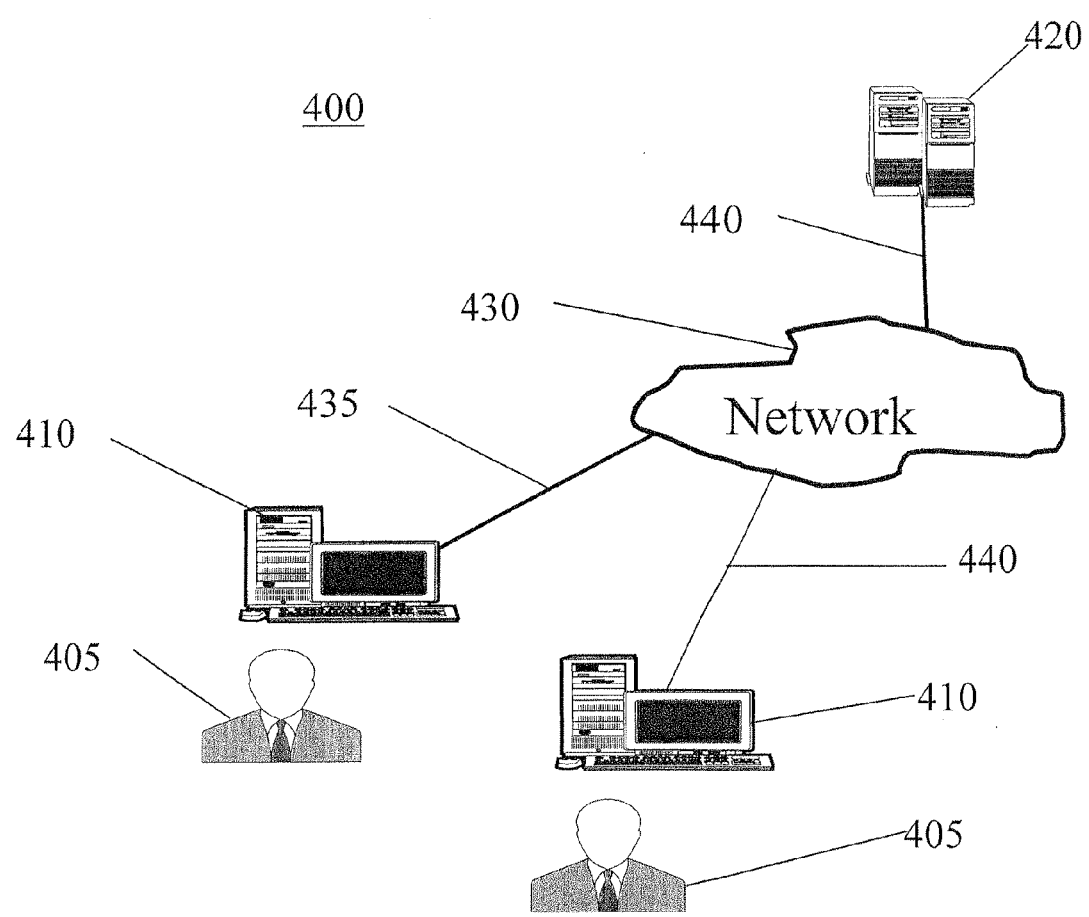
FIG. 4 shows a communication system 300 involving use of various features in accordance with aspects of the present invention.

FIG. 4 shows a communication system 400 involving use of various features in accordance with aspects of the present invention. The communication system 400 includes one or more assessors 405 (also referred to interchangeably herein as one or more "users") and one or more terminals 410 accessible by the one or more assessors 405. In one aspect, operations in accordance with aspects of the present invention is, for example, input and/or accessed by an assessor 405 via terminal 410, such as personal computers (PCs), minicomputers, mainframe computers, microcomputers, telephonic devices, or wireless devices, such as personal digital assistants ("PDAs") or a hand-held wireless devices coupled to a remote device 420, such as a server, PC, minicomputer, mainframe computer, microcomputer, or other device having a processor and a repository for data and/or connection to a repository for data, via, for example, a network 430, such as the Internet or an intranet, and couplings 435, 440. The couplings 435, 440 include, for example, wired, wireless, or fiberoptic links. In another aspect, the method and system of the present invention operate in a stand-alone environment, such as on a single terminal.

Figure 5:
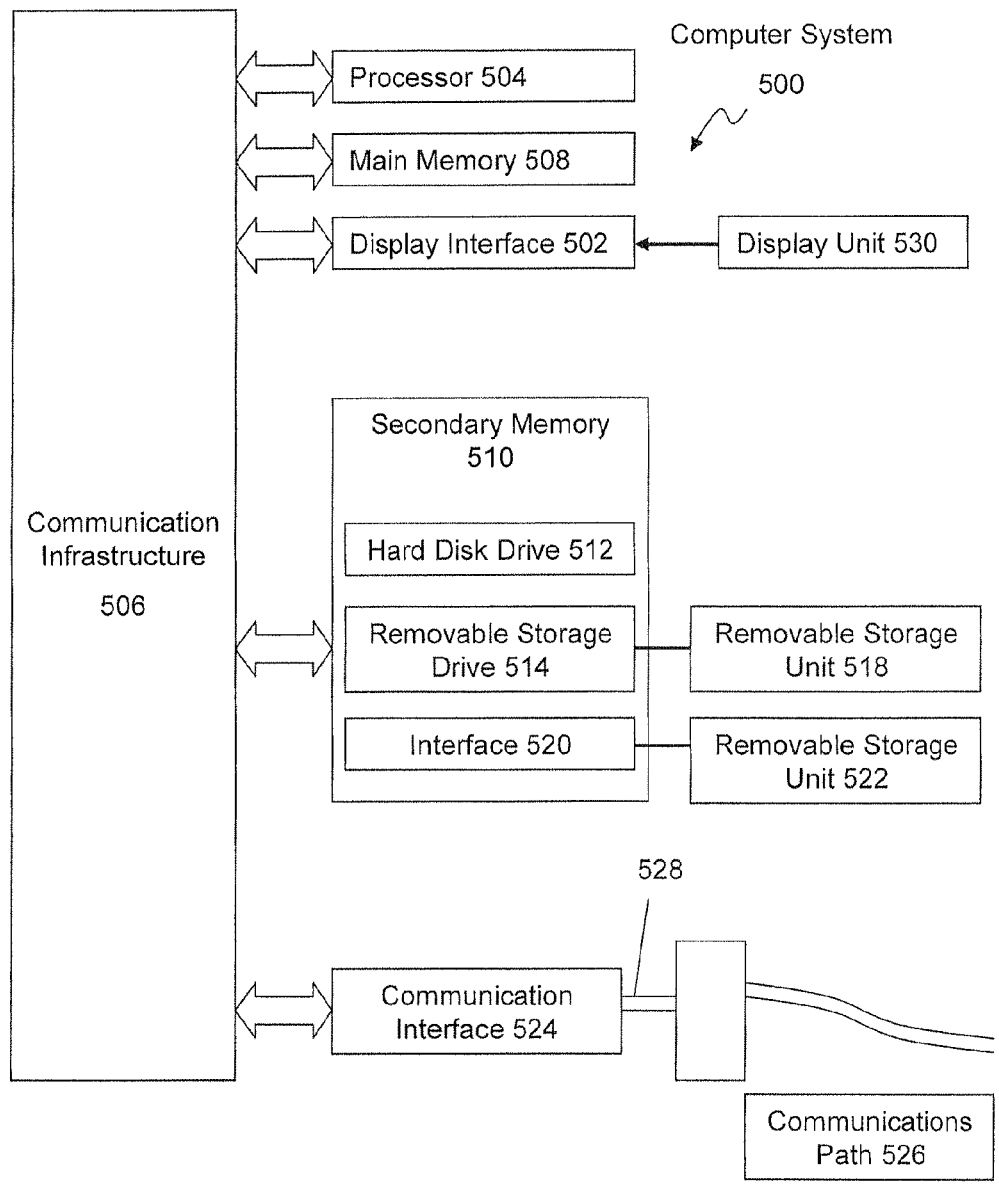
FIG. 5 is a block diagram of various aspects of an exemplary computer system usable in accordance with aspects of the present invention.

In some variations, aspects of the present invention may be directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 510 to perform the features of the present invention. Accordingly, such computer programs represent controllers of the computer system 500.

In an aspect where the invention is implemented using software, the software may be stored in a computer program product and loaded into computer system 500 using removable storage drive 514, hard drive 512, or communications interface 520. The control logic (software), when executed by the processor 504, causes the processor 504 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 6:
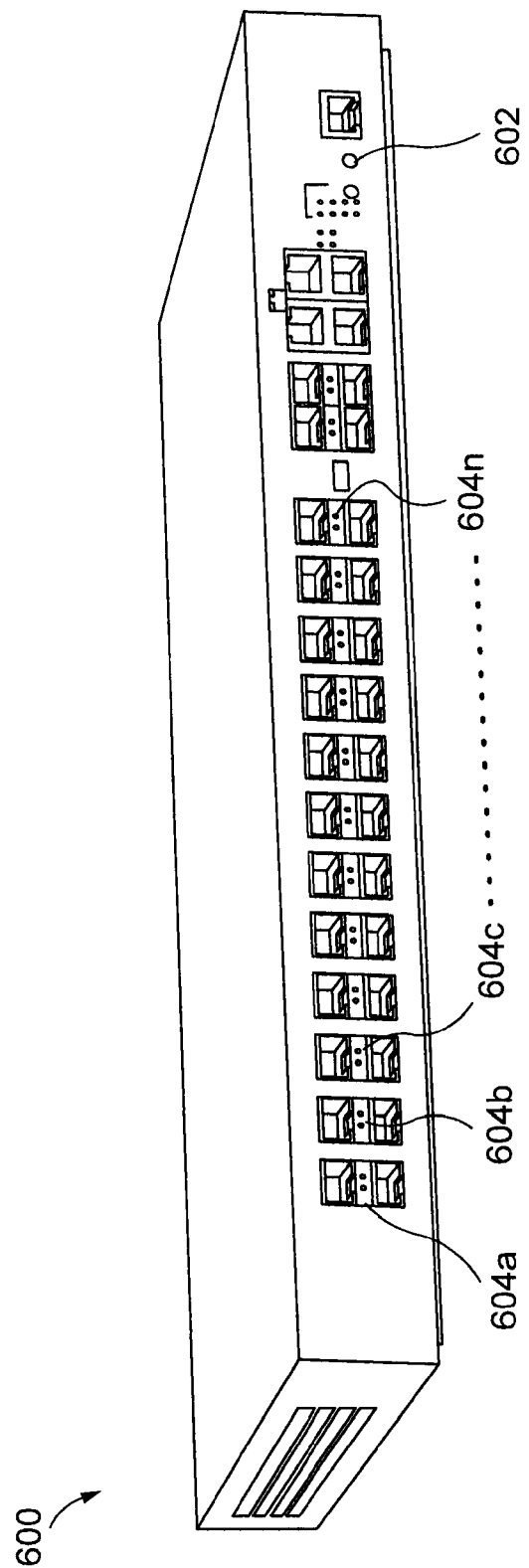
FIG. 6 is a Photostat of an exemplary device having a physical switch for controlling one or more indicators, in accordance with aspects of the present invention.

Referring now to FIG. 6, illustrated is a Photostat of an exemplary device 600 having a physical switch 602 for controlling one or more indicators 604a . . . 604n, in accordance with aspects of the present invention. By selecting switch 602, the user can toggle the indicators on or off. It should be appreciated that the device may operate in various modes, e.g., a low power mode enables the conservation of power by turning off some indicators when they are not required while keeping other indicators turned on, or a full power mode where all the indicators are turned on, among other modes of operation.

Figure 7:
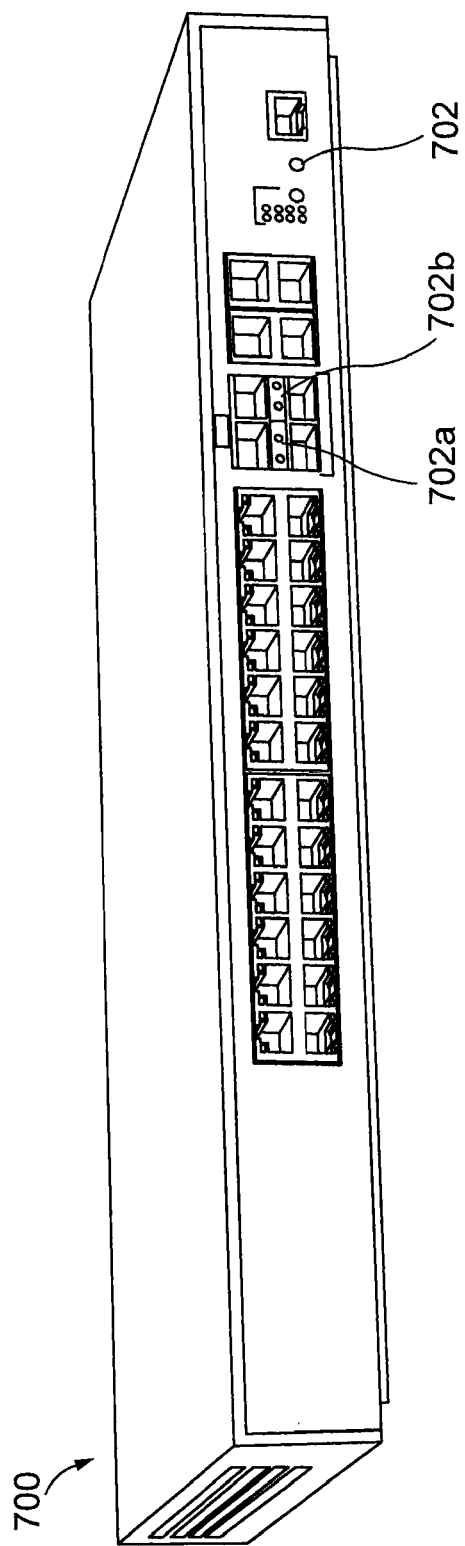
FIG. 7 is a Photostat of another exemplary device having a physical switch for controlling one or more indicators, in accordance with aspects of the present invention.

Turning now to FIG. 7, illustrated is a Photostat of another exemplary device 700 having a physical switch 702 for controlling one or more indicators 702a, 702b, in accordance with aspects of the present invention. As discussed above, by selecting switch 702, the user can toggle the indicators on or off.

While the present invention has been described in connection with various aspects of the present invention, it will be understood by those skilled in the art that variations and modifications of the aspects of the present invention described above may be made without departing from the scope of the invention. Other aspects will be apparent to those skilled in the art from a consideration of the specification or from a practice of the invention disclosed herein.

What is claimed is:

1. A method for controlling indicators on a switching device, the method comprising:
   enabling one or more sets of indicators on the switching device;
   triggering the disablement of one or more of a first set of indicators on the switching device based upon a disabling event, wherein the first set of indicators is non-essential for operating the switching device and wherein the disabling event controls each indicator individually independent of a status of the other indicators; and upon detecting an enabling event, re-enabling one or more of the disabled indicators, wherein at least one of a second set of indicators remains continuously enabled, and wherein at least one of the one or more sets of indicators is automatically disabled after a specified period of time independent of a status of a function associated with the at least one of the one or more sets of indicators.

2. The method of claim 1, wherein the first set of indicators include a visual indicator.

3. The method of claim 2, wherein the visual indicator is one of a light emitting diode (LED), a liquid crystal display (LCD), plasma, and a light bulb.

4. The method of claim 1, wherein the first set of indicators include an audio indicator.

5. The method of claim 1, wherein the first set of indicators include both a visual indicator and an audio indicator.

6. The method of claim 1, wherein the disabling event includes one of a timer expiring after a predetermined time period, deactivating a light detector, remotely controlling the indicators, and a user turning off a switch on the switching device.

7. The method of claim 1, wherein the enabling event includes one of a timer expiring after a predetermined time period, activating a light detector, activating a motion detector, remotely controlling the indicators, detecting an occurrence of a problem on the switching device, and a user turning on a switch on the switching device.

8. The method of claim 1, further comprising:
disabling one or more of the re-enabled indicators based upon a new disabling event.

9. The method of claim 1, wherein the second set of indicators indicate an active system status.

10. The method of claim 1, wherein the disabling event includes a loss of illumination in a location surrounding the switching device.

11. The method of claim 1, wherein the switching device includes a power state comprising one of on, off, standby, and low power on.

12. The method of claim 1, further comprising:
receiving an identification of power wastage in the switching device;
wherein the disablement of the indicators eliminates the identified power wastage in the switching device.

13. A switch control element, comprising:
a switch control;
a hardware switch coupled to the switch control via a first coupling, wherein the switch control enables a hardware switch operation; and
an indicator coupled to the hardware switch via a second coupling, wherein the hardware switch operation controls an indicator operation,
wherein the indicator operation disables a first set of indicators non-essential for operating the device and wherein the indicator operation controls each indicator individually independent of a status of the other indicators, and
wherein a second set of indicators remains continuously enabled, and
wherein at least one of the one or more sets of indicators is automatically disabled after a specified period of time independent of a status of a function associated with the at least one of the one or more sets of indicators.

14. The switch control element of claim 13, wherein the hardware switch comprises a communication sensor for producing an output upon a detection; and
wherein the hardware switch comprises a transistor coupled to the indicator via the second coupling, wherein the transistor produces the hardware switch operation.

15. The switch control element of claim 14, wherein the communication sensor is one of an infrared sensor, a pressure sensor and a wireless sensor.

16. The switch control element of claim 13, wherein the indicator operation enables the indicator.

17. A switch control element, comprising:
a switch control software;
an indicator control device coupled to the switch control software via a logical connection, wherein an output from the switch control software controls the indicator control device;
an indicator coupled to the indicator control device via a coupling, wherein the indicator control device controls an indicator operation,
wherein the indicator operation disables a first set of indicators non-essential for operating the device and wherein the indicator operation controls each indicator individually independent of a status of the other indicators, and
wherein a second set of indicators remains continuously enabled, and
wherein at least one of the one or more sets of indicators is automatically disabled after a specified period of time independent of a status of a function associated with the at least one of the one or more sets of indicators.

18. The switch control element of claim 17, wherein the indicator operation enables the indicator.

19. A system for controlling indicators on a switching device, the apparatus comprising:
a module for enabling one or more sets of indicators on the switching device;
a module for triggering the disablement of one or more of a first set of indicators on the switching device based upon a disabling event, wherein the first set of indicators is non-essential for operating the switching device and wherein the disabling event controls each indicator individually independent of a status of the other indicators; and
upon detecting an enabling event, a module for re-enabling one or more of the disabled indicators,
wherein at least one of a second set of indicators remains continuously enabled, and
wherein at least one of the one or more sets of indicators is automatically disabled after a specified period of time independent of a status of a function associated with the at least one of the one or more sets of indicators.

20. The system of claim 19, wherein the first set of indicators include a visual indicator.

21. The system of claim 20, wherein the visual indicator is one of a light emitting diode (LED), a liquid crystal display (LCD), plasma, and a light bulb.

22. The system of claim 19, wherein the first set of indicators include an audio indicator.

23. The system of claim 19, wherein the first set of indicators include both a visual indicator and an audio indicator.

24. The system of claim 19, wherein the disabling event includes one of a timer expiring after a predetermined time period, deactivating a light detector, remotely controlling the indicators, and a user turning off a switch on the switching device.

25. The system of claim 19, wherein the enabling event includes one of a timer expiring after a predetermined time period, activating a light detector, activating a motion detector, remotely controlling the indicators, detecting an occurrence of a problem on the switching device, and a user turning on a switch on the switching device.

26. The system of claim 19, further comprising:
a module for disabling one or more of the re-enabled indicators based upon a new disabling event.

27. A computer program product comprising a non-transitory computer usable medium having control logic stored therein for causing a computer to control indicators on a switching device, the control logic comprising:
computer readable program code means for enabling one or more sets of indicators on the switching device;
computer readable program code means for triggering the disablement of one or more of a first set of indicators on the switching device based upon a disabling event, wherein the first set of indicators is non-essential for operating the switching device and wherein the disabling event controls each indicator individually independent of a status of the other indicators; and
computer readable program code means for re-enabling one or more of the disabled indicators upon detecting an enabling event,
wherein at least one of a second set of indicators remains continuously enabled, and
wherein at least one of the one or more sets of indicators is automatically disabled after a specified period of time independent of a status of a function associated with the at least one of the one or more sets of indicators.

* * * * *